United States Patent [19]

Kueker

[11] Patent Number: 4,479,554
[45] Date of Patent: Oct. 30, 1984

[54] METHOD AND APPARATUS FOR MOUNTING AND LIFTING IMPLEMENT EXTENSION WINGS

[75] Inventor: Darrel D. Kueker, Windsor, Colo.

[73] Assignee: J. B. McCoy Construction Co., Greeley, Colo.

[21] Appl. No.: 389,452

[22] Filed: Jun. 17, 1982

[51] Int. Cl.³ .............................................. A01B 73/00
[52] U.S. Cl. ..................................... 172/311; 74/104; 74/105
[58] Field of Search .................. 172/1, 311, 446, 456, 172/501, 662, 776; 74/101, 102, 104, 105, 106, 96

[56] References Cited

U.S. PATENT DOCUMENTS

| | | | |
|---|---|---|---|
| 638,769 | 12/1899 | Smith | 172/456 |
| 2,982,080 | 5/1961 | Martin | 172/456 X |
| 3,263,515 | 8/1966 | Adamski | 74/105 |
| 3,797,580 | 3/1974 | Roth | 172/311 |
| 3,866,689 | 2/1975 | Anderson | 172/311 |
| 3,948,327 | 4/1976 | Parker et al. | 172/311 |
| 4,178,998 | 12/1979 | Rockwell | 172/311 |

Primary Examiner—Richard T. Stouffer
Assistant Examiner—William H. Honaker
Attorney, Agent, or Firm—Young & Martin

[57] ABSTRACT

A mulch crimper implement for use in agricultural and horticultural applications is disclosed with a flexible mounting for extension wings that accommodates both pivotal and vertical movement of the wing in relation to the main frame of the implement. The mounting includes slotted pivot mounting holes in a pair of brackets positioned between and above the wing and main frame. A power lift system operated with a hydraulic cylinder utilizes the slotted hole wing mounting system for pivoting the wing through an angle greater than 180 degrees between work position adjacent the main frame and a transportation and storage position over the main frame.

8 Claims, 17 Drawing Figures

METHOD AND APPARATUS FOR MOUNTING AND LIFTING IMPLEMENT EXTENSION WINGS

BACKGROUND

The present invention is related to agricultural and horticultural implements, and more specifically to flexible mounting of extension wings for implements and a method and hydraulic lift apparatus for such wings.

The desireability of efficient and economic use of time and energy has contributed to the feasibility of larger mulching and tilling implements for agricultural and horticultural uses. Since there are practical and legal limitations for transporting such implements on public highways additional width for such implements are often provided by including extensions or wings of additional mulching or tilling tools on the lateral ends of an implement. In order to provide flexibility, it is common to mount such extension wings on implements in such a manner that they can be folded down into a use position for work and folded up and out of the way for transportation and storage. In recent years, with the advent of significantly larger implements and extension wings, such lifting and folding mechanisms are now often power operated, such as with hydraulic cylinders connected to the hydraulic system of a tractor.

Extension wings and powered lifting and folding apparatus for such wings existing prior to this invention have been appropriate and useful for conventional agricultural applications. However, such conventional apparatus prior to this invention have lacked the flexibility and utility required for some specialized applications, such as crimping and fixing mulch in newly seeded road ditches, mining reclamation areas, pipeline rights of way, and other locations where sharp variations in terrain and tight operating spaces are commonly encountered.

SUMMARY OF THE INVENTION

Accordingly, it is an object of the present invention to provide a novel flexible mounting structure for extension wings capable of accommodating sharp variations in ground terrain.

It is also an object of the present invention to provide extension wing apparatus for agricultural and horticultural implements wherein the wing is capable of vertical as well as pivotal movement in relation to the main implement frame.

Another object of the present invention is to provide flexible extension wing apparatus for sharply contoured terrain that is foldable to an out-of-the-way position for transportation and storage.

A still further object of the present invention is to provide hydraulically powered lift apparatus for folding a flexible extension wing on agricultural and horticultural implements to a non-use position through a rotation of more than 180 degrees.

The flexible extension wings of the present invention are provided with attachment arms that are movable vertically as well as pivotally in relation to the main frame of an agricultural or horticultural implement, such as the mulch crimper implement described in this disclosure. The mounting arms include a slotted hole adapted for pivotal and vertically slidable mounting on a support shaft on the main frame. The invention also includes a method and hydraulic powered lift apparatus that operates in combination with the slotted hole mounting of the wing apparatus to the main frame to effectively pivot the wing through an angle greater than 180 degrees from the use position to the transportation and storage position.

BRIEF DESCRIPTION OF THE DRAWINGS

Other objects, advantages, and capabilities of the present invention will become more obvious as the description proceeds, taken in conjunction with the drawings, in which.

DETAILED DESCRIPTION OF THE PREFERRED EMBODIMENT

A mulch crimper implement 10 is shown in FIGS. 1 through 4 equipped with left and right extension wings 60, 120, respectively, flexibly mounted to the main frame 12 according to the present invention. The mulch crimper 10 is generally comprised of a rectangular main frame 12 having parallel, spaced-apart elongated front beam 28 and rear beam 30 joined together at their ends by the left end beam 32 and right end beam 34. A rigid, elongated pole extends forwardly from the rectangular main frame 12 and has a hitch mechanism 22 on its distal end adapted for hitching to a pulling vehicle, such as a tractor (not shown). Angular braces 24, 26 extend respectively from the left and right ends of the main frame 12 to the mid-section of the pole 20 to support and strengthen the pole 20. An elongated main axle 14 with the plurality of flat circular discs 18 mounted thereon in spaced apart relation to each other is positioned under the main frame 12. A plurality of main supports 16 extend downwardly from the main frame 12, and the main axle 14 is journeled in the bearing blocks at the bottom of main supports 16. The discs 18 are adapted to roll over and penetrate into the ground to crimp and fix mulch into the soil as the mulch crimper 10 is pulled forwardly by a tractor (not shown).

The mulch crimper 10 disclosed herein is also provided with a lift and carriage apparatus for lifting the main frame 12 and discs 18 upwardly away from the ground for transportation. This lift and carriage assembly is comprised of a pair of wheels 40, 46 positioned behind the main frame 12 in spaced apart relation to each other, left and right wheel support arms 38, 44, respectively, rigidly attached to and extending rearwardly from an elongated support pipe 35, and a hydraulic cylinder 50. The support pipe 35 is positioned adjacent and parallel to the rear beam 30 of main frame 12. It is pivotally mounted to the rear beam 30 by journel boxes 36, 37 positioned respectively at opposite ends of pipe 35.

Pivotal movement of the elongated support pipe 35 is effective to move the distal ends of wheel support arms 38, 44 upwardly and downwardly. The wheels 40, 46 are mounted to the distal ends of respective support arms 38, 44 by respective wheel axles 42, 48.

A lift arm 54 is rigidly attached to and extends upwardly from the mid-point of the elongated support pipe 35, and a hydraulic cylinder positioned over the main frame 12 is adapted to rotate the elongated support pipe 35 in opposite directions. The blind end of the cylinder 50 is anchored to the pole 20 by cylinder mounting block 52, and the rod 51 of cylinder 50 is connected to the lift arm 54. The cylinder 50 is preferably double acting and operates in a conventional manner such that extension of rod 51 rotates the elongated support pipe 35 rearwardly causing the wheels 40, 46 to move downwardly and bear on the ground, thus lifting the discs 18 off the ground. Conversely, retraction of the rod 51 into the cylinder 50 is effective to move the wheels 40, 46 upwardly, thereby lowering the discs 18 to the ground.

Figure 2:
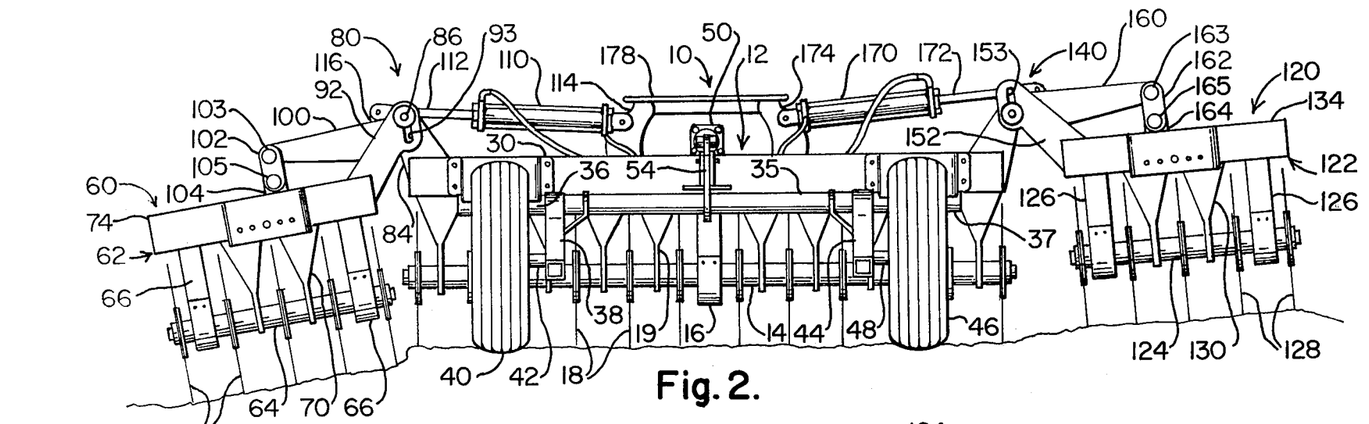
FIG. 2 is a rear elevation view of the mulch crimper implement, showing the left wing extending outwardly and downwardly from the main frame and showing the right wing extending outwardly and upwardly from the main frame to illustrate the flexibility of the structure.

As mentioned above, a unique feature of this invention is the flexible extension wing structure utilized to expand the working span of the mulch crimper implement 10 during mulch crimping operations while accommodating relatively severe variations in terrain. This flexibility is best illustrated in FIG. 2, wherein left wing 60 is shown extending outwardly and downwardly from the main frame 12 while right wing 120 is extending outwardly and upwardly. It is significant to note that the connecting structures between the wings 60, 120 and the main frame 12 not only accommodate pivotal movement of the wings 60, 120 in relation to the main frame 12, but they also accommodate vertical movement as well. Consequently, as shown in FIG. 2, left wing 60 is not only pivoted angularly downward with respect to the main frame 12, but the wing axle 64 is also offset vertically downwardly in relation to main axle 14. Likewise, where there is a sharp rise in the ground, such as that illustrated on the right side of FIG. 2, the right wing 120 cannot only pivot upwardly to accommodate an incline in the ground, but the wing axle 124 of the wing 120 can also move upwardly to a vertically offset position in relation to the main axle 14 to accommodate a sharp rise in the ground. Of course, both the left wing 60 and the right wing 120 can accommodate upward and downward pivoting as well as vertical movement of the axle upwardly and downwardly.

Figures 1, 5:
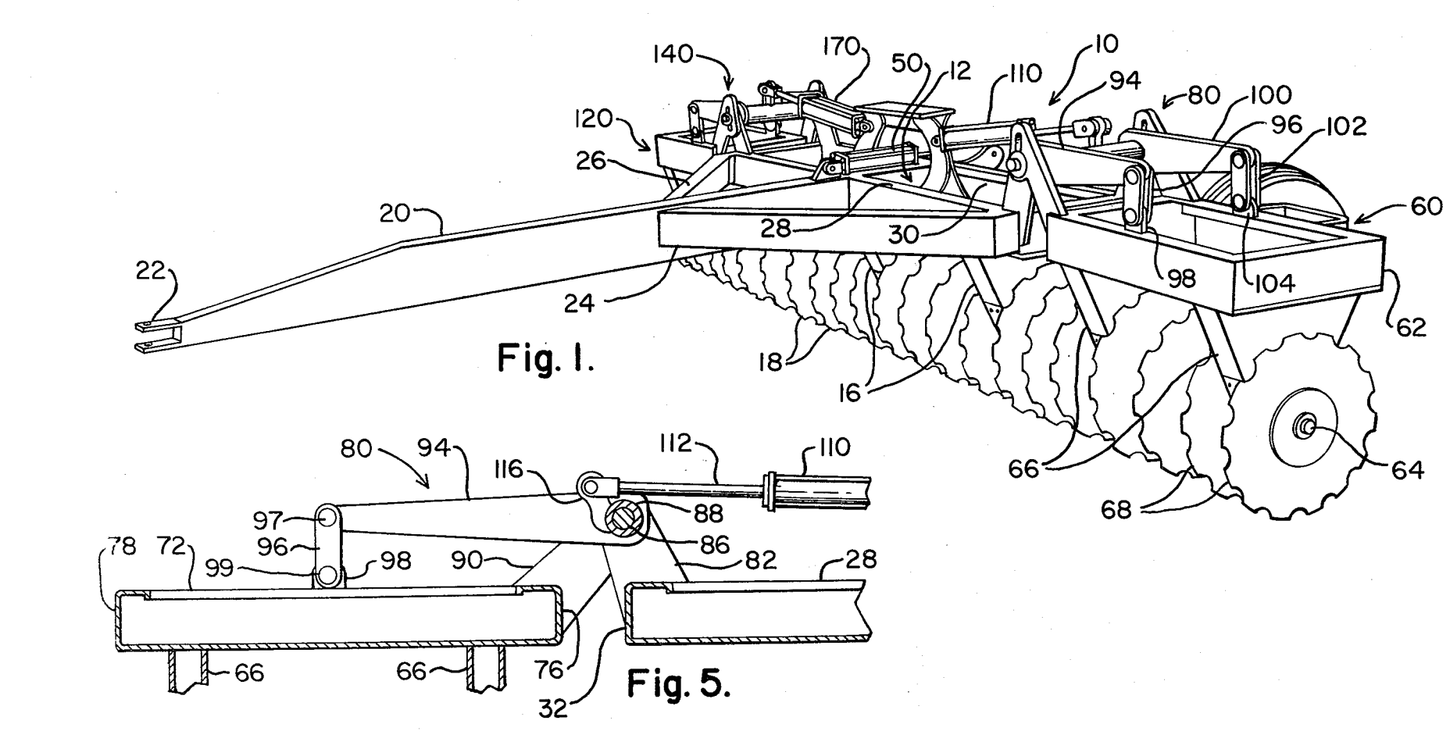
FIG. 1 is a perspective view of a mulch crimper implement equipped with the flexible extension wings and hydraulic lift apparatus of the present invention.
FIG. 5 is a sectional view of the unique flexible wing mounting and lift apparatus of the present invention taken along lines 5—5 of FIG. 4.
Figure 4:
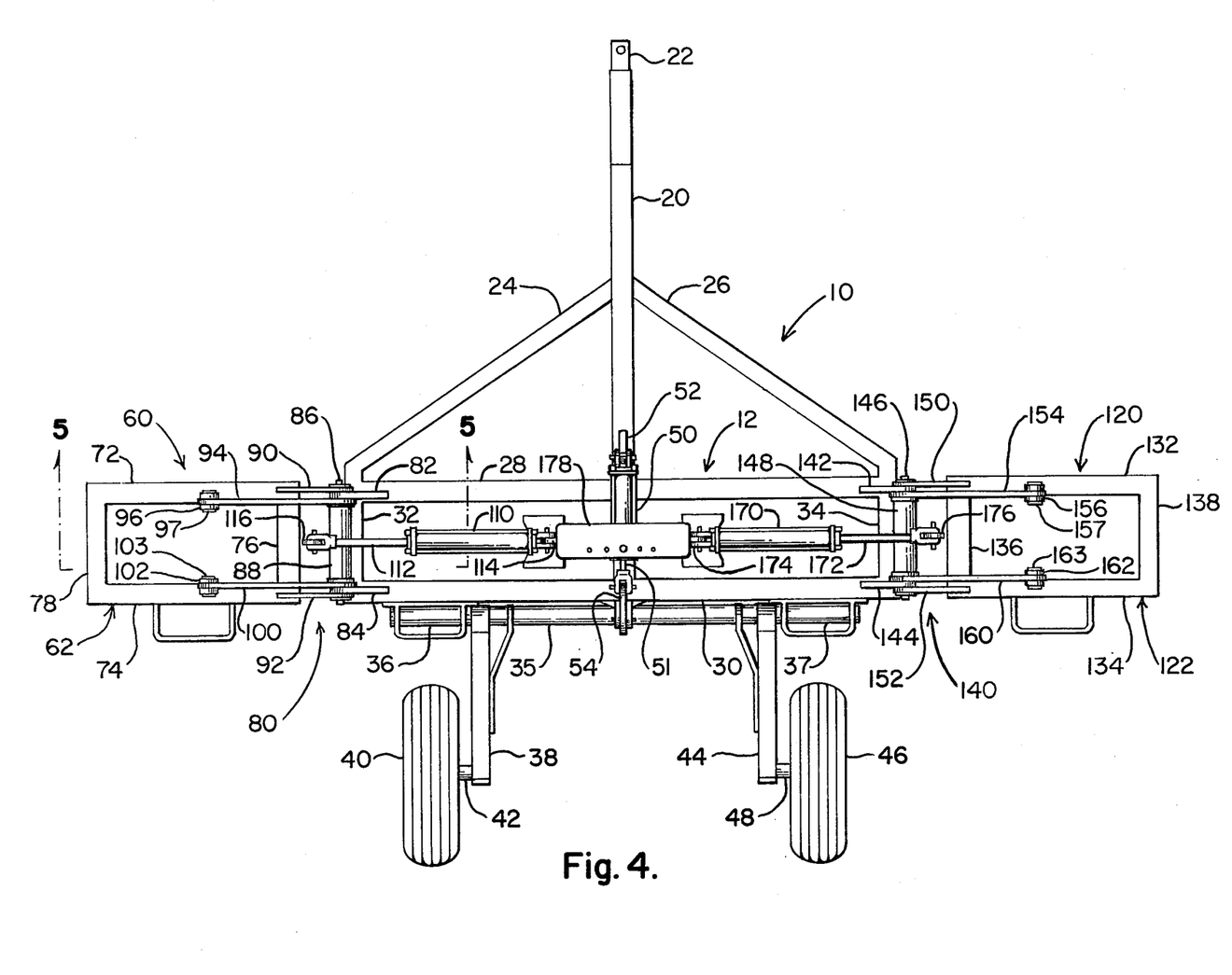
FIG. 4 is a plan view of the mulch crimper implement with the wings folded down and extending outwardly for use in crimping and mulching operations.

This enhanced wing flexibility to accommodate sharp variations in ground terrain is accomplished by the unique wing mounting structure of this invention. Referring to FIGS. 1, 2 and 4, the left wing 60 is comprised of a frame and tool structure similar to the main section of the mulch crimper. It includes a rectangular frame 62 comprised of parallel, spaced-apart front and rear elongated beams 72, 74, respectively. The front and rear beams 72, 74 are joined at the ends by an inside cross beam 76 and an outside cross beam 78. A plurality of flat circular discs 68 are mounted in spaced apart relation to each other on a wing axle 64. The wing axle 64 is rotatably mounted under the wing frame 62 by a plurality of spaced apart wing supports and bearing blocks 66. Mud and rock scrapers 70 are provided between the discs 68.

The left wing 60 is connected to the main frame 12 of the mulch crimper by a pair of front and rear wing brackets 90, 92, respectively. These wing brackets 90, 92 extend upwardly and inwardly in spaced apart relation to each other from the inside beam 76 of the wing frame 62. These wing brackets 90, 92 are pivotally mounted by shaft 86 to a pair of front and rear mounting brackets 82, 84 attached to and extending rigidly upward and outward from the left beam 32 of main frame 12. The front and rear wing brackets 90, 92 are each provided with a substantially vertical slotted hole 93 at the upper distal end thereof through which the shaft 86 is positioned. This mounting structure with the shaft 86 extending through the slotted holes 93 allows the wing 60 to move pivotally about the shaft 86 as well as vertically up and down in relation to the main axle 14.

Figure 3:
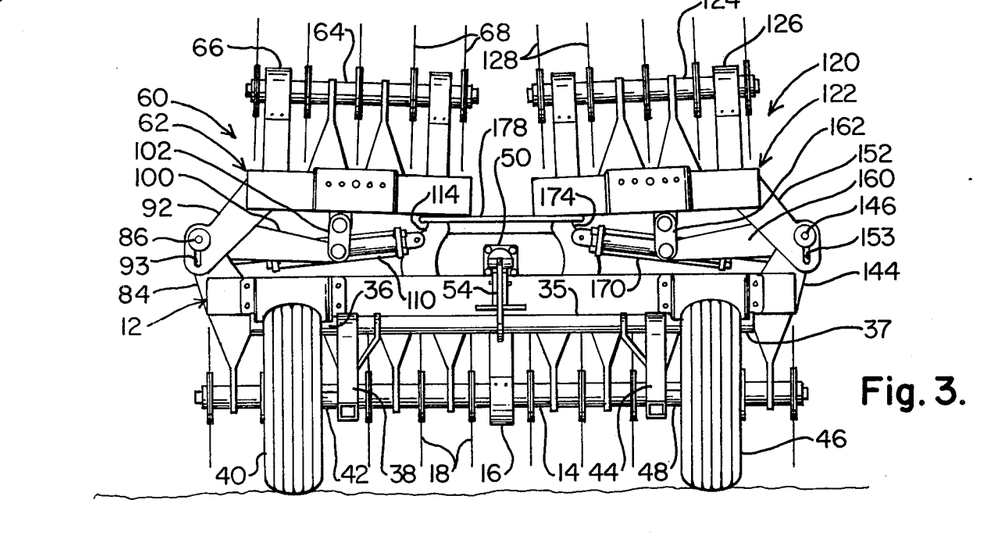
FIG. 3 is a rear elevation view of the mulch crimper implement with the wings folded into the transportation and storage position.

The powered wing lift system of the present invention is also unique in its structure and in its ability to pivot the wings from the work position through an angle of more than 180 degrees to the transportation and storage position shown in FIG. 3, while allowing the flexibility of wing movement in relation to the main frame 12 as described above. The structure of the left wing lift apparatus 80 is best described with reference to FIGS. 1 through 5. An elongated pipe 88 is rotatably positioned concentrically on the shaft 86 between the front and rear mounting brackets 82, 84. A pair of elongated front and rear lift arms 94, 100, respectively, are rigidly affixed to opposite ends of the pipe 88 and extend outwardly from the pipe 88 to a position over the front and rear beams 72, 74, respectively of the wing frame 62.

The distal ends of the lift arms 94, 100 are flexibly connected to the wing frame 62 by downwardly depending links 96, 102, respectively. The front link 96 is pivotally attached by pin 97 to the distal end of the front lift arm 94. It is also pivotally attached by pin 99 to a rigid ear 98 extending upwardly from the front beam 72. Likewise, the rear link 102 is pivotally connected to the distal end of rear lift arm 100 by pin 103 and to the rigid ear 104 extending upwardly from rear beam 74 by pin 105. It is preferred that the distal ends of the lift arms 94, 100 are connected to the mid-section of frame 62 so the weight of the wing 60 outward of the connections approximately balances the weight inward of the connections.

When the wing 60 is connected to the lift arms 94, 100, in this manner, the lift arms 94, 100 can lift the wing 60 upwardly and pivot it about the shaft 86 to the folded transportation and storage position shown in FIG. 3. Also, the rigid wing brackets 90, 92 can move upwardly and downwardly in relation to the shaft 86 the distance of the slotted holes 93 while pivoting about pins 97, 103 or 99, 105. Also, upward and downward movement of the lift arms 94, 100 approximately of the distance of the slotted holes 93 can result in vertical movement of the wing 60 upwardly and downwardly in relation to the main frame 12 of the mulch crimper 10. Of course, the flexibility of this wing mounting could also be obtained by providing the slotted holes in the distal ends of the mounting brackets 82, 84 and connecting the shaft 86 to the wing brackets 90, 92.

The wing lift apparatus 80 also includes a hydraulic cylinder 110 for pivoting the lift arms 94, 100 upwardly and downwardly. The blind end of cylinder 110 is anchored to a cylinder mounting bracket 114 on the main frame 12. The rod 112 of cylinder 110 is attached at its distal end to a rigid bracket or lever 116 affixed to and extending upwardly and outwardly from the pipe 88. Therefore, retraction of the rod 112 into the hydraulic cylinder 110 causes the lift arms 94, 100 to pivot upwardly, and extension of rod 112 allows the lift arms 94, 100 to pivot downwardly.

As mentioned above, this lift apparatus 80 in combination with the slotted hole mounting 93 of the wing 60 to the main frame 12 is effective to pivot the wing 60 through an angle of more than 180 degrees with the hydraulic cylinder 110. This unique wing lifting and folding capability is best described by reference to FIGS. 6 through 17, which illustrate sequential positions of the wing 60 as it is lifted from the use position and folded to the transportation and storage position and then unfolded and lowered again to the use position.

Figure 6:
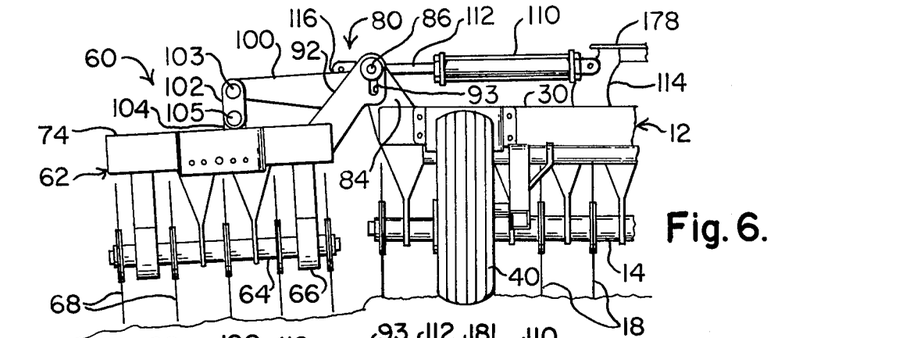
FIGS. 6 through 11 illustrate the sequential positions of the left wing and lift apparatus of the present invention as the wing is moved from the fully extended position to the folded transportation and storage position.
Figure 7:
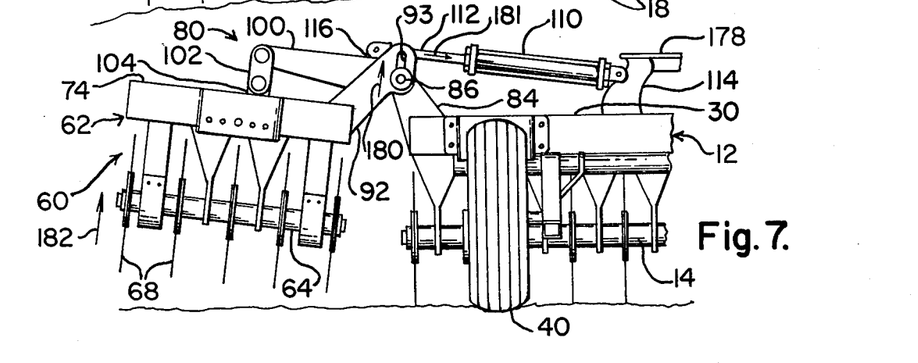

The wing 60 is shown in FIG. 6 in the use position extending outwardly and downwardly from the main frame 12 with the wing axle 64 dropped vertically downward in relation to the main axle 14. In this position, the rod 112 of cylinder 110 is fully extended, and the shaft 86 is positioned at the top of slotted hole 93. As the rod 112 of hydraulic cylinder 110 begins to retract inwardly as shown by arrow 181, the lift arms 94, 100 begin to lift upwardly, thereby applying an upward force to the wing 60. This upward force causes both the inner and outer ends of wings 60 to move upwardly as shown by arrows 180, 182 in FIG. 7. As the inner end of the wing 60 is pulled upwardly, the wing bracket 92 shifts upwardly so that the shaft 86 is positioned in the bottom of slotted hole 93.

Figure 8:
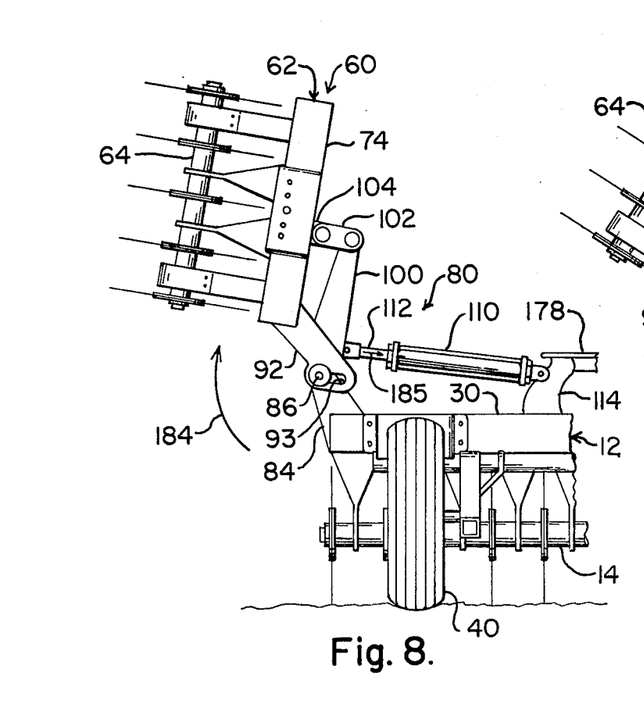
Figure 9:
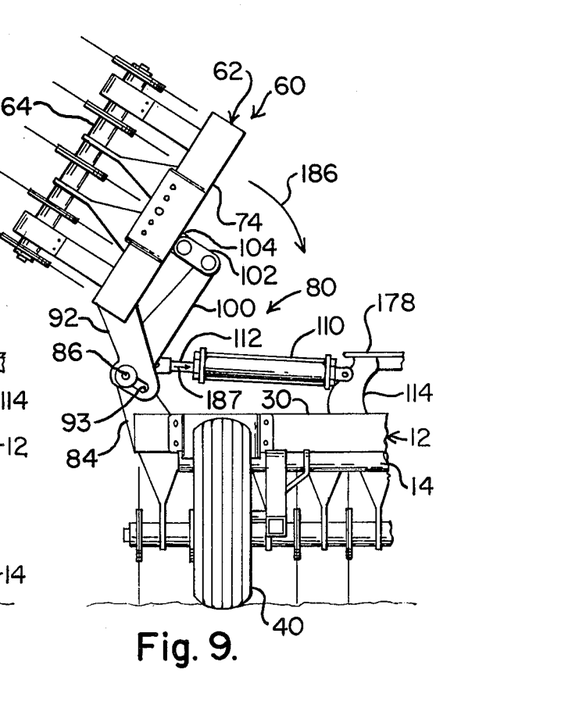

As the rod 112 of cylinder 110 continues to be retracted inwardly as indicated by arrow 185 in FIG. 8, the wing 60 continues to pivot upwardly, as indicated by arrow 184 about shaft 86, which remains positioned in the bottom of slotted hole 93. FIG. 9 illustrates a continuation of the pivotal movement of the wing 60 about shaft 86 as indicated by arrow 186, as the rod 112 of cylinder 110 continues to be retracted inwardly in the direction of arrow 187. It should be noted here that the shaft 86 has still not shifted position in the slotted 93, although the wing brackets 90, 92 are pivoted about shaft 86 92 are turned nearly upside down such that the portion that was the top of slotted hole 93 is now rotated to a position under shaft 86.

Figure 10:
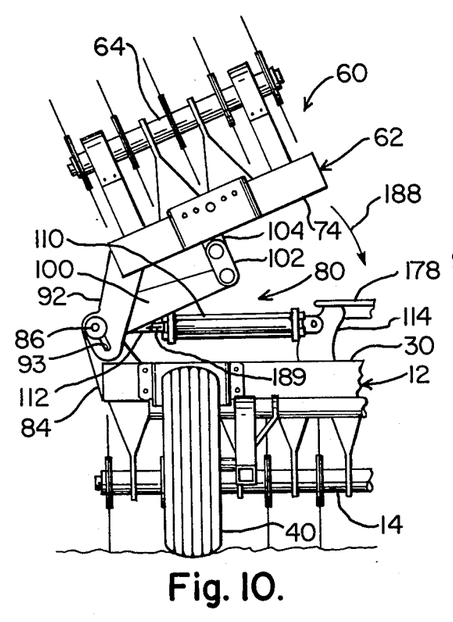

At approximately the position shown in FIG. 10, with the wing 60 having been pivoted through nearly 180 degrees from the starting or fully extended position, the rod 112 of the hydraulic cylinder 110 is fully retracted. This condition occurs when the hydraulic cylinder mounting pins are aligned in a straight line with shaft 86. At this point, an "over-center" motion must occur to carry the rod mounting pin below the line between the shaft 86 and the mounting pin at the blind end of the cylinder. When this "over center" motion occurs, the operator can reverse the motion of rod 112 to begin extending it in the direction indicated by arrow 189 in order to continue the pivotal movement of the wing 60 in the direction shown by arrow 188. This "over center" motion is induced by the weight of the wing 60. Once this over center movement is accomplished so that the rod 112 can be extended outwardly from the cylinder 110, the pivotal movement of the wing 60 continues through an angle greater than 180 degrees to the folded transportation and storage position shown in FIG. 11. In this transportation and storage position, the distal or outer end of the wing rests on shelf 178 a spaced distance above main frame 12. The inner end continues to rest on shaft 86, which remains in the same position in slotted hole 93 as was occupied by the shaft 86 throughout this entire folding movement.

Figure 11:
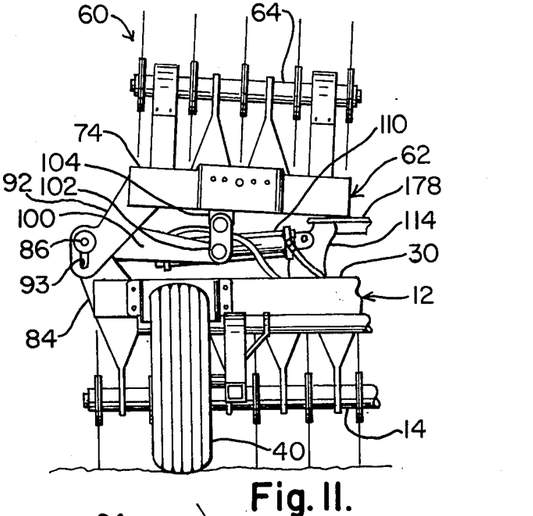
Figure 17:
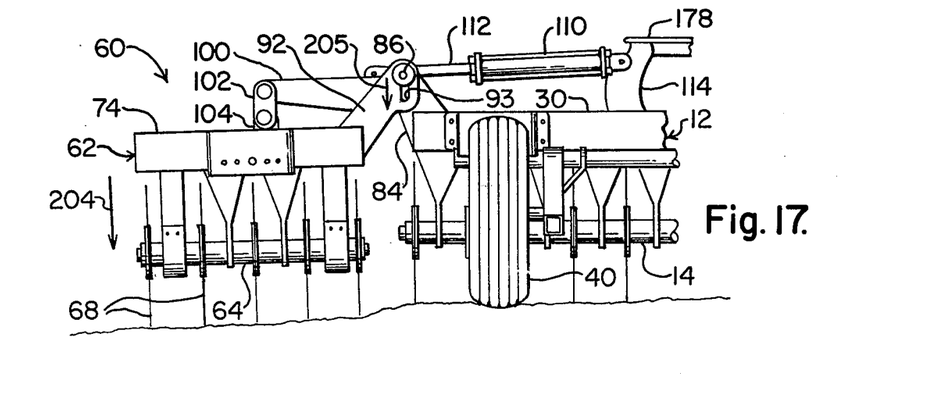

The hydraulic lift apparatus 80 of the present invention is also capable of pivoting the wing 60 in the opposite direction to move it from the folded transportation and storage position shown in FIG. 11 to the fully extended position shown in FIG. 17. The sequential positions of this unfolding movement through an angle of greater than 180 degrees are illustrated in FIGS. 12 through 17.

Figure 12:
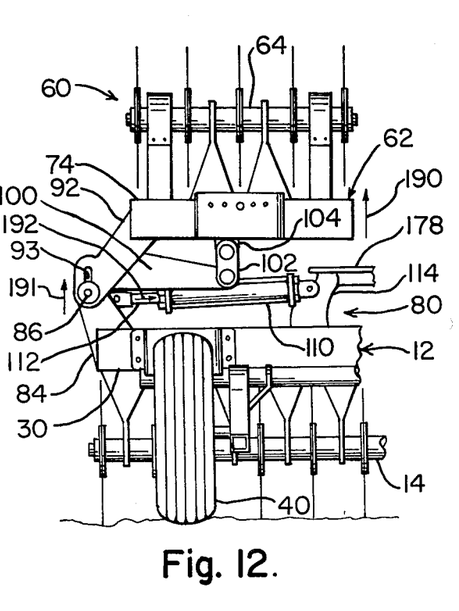
FIGS. 12 through 17 show the left wing and lifting apparatus in sequential positions as the wing is moved from the folded transportation and storage position to the fully extended position.

The beginning of this unfolding movement is shown in FIG. 12, wherein the rod 112 of cylinder 110 begins the movement by retracting in the direction of arrow 192. As the rod 112 is retracted in this inital movement, the lift arms 94, 100 move upwardly and cause the entire wing 60 to move vertically upwardly off the shelf 178 as indicated by arrow 190. This upward movement of the wing 60 also causes the wing mounting brackets 90, 92 to move vertically upward, thereby shifting the positions of shaft 86 to the opposite end of slotted hole 93.

Figure 13:
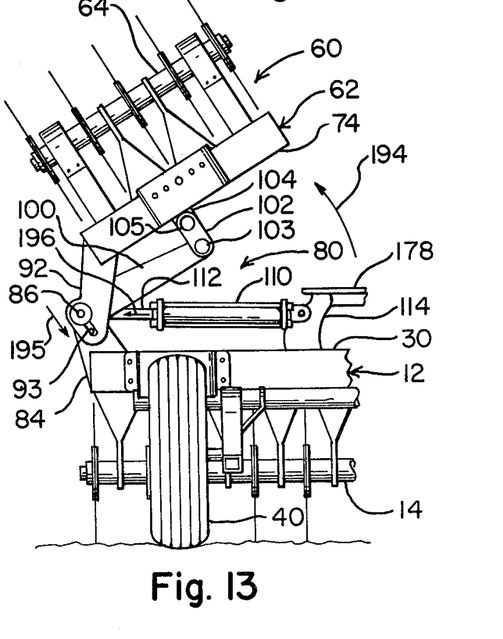

Continued retraction of the rod 112 into the cylinder 110 causes the wing 60 to pivot upwardly about shaft 86 in the direction of arrow 194 to the approximate position shown in FIG. 13. In this position, the mounting pins of the hydraulic cylinder 110 and rod 112 become aligned again with shaft 86 such that continued retraction of the rod 112 or extension of the rod 112 is resisted by the in-line neutral mechanical position of these components. Therefore, in order to continue the unfolding pivotal movement of the wing 60 in the direction of arrow 194, it is necessary to accomplish an upwardly directed "over center" motion so that the rod 112 of cylinder 110 can be extended over shaft 86. Such "over center" motion at this phase is not accomplished naturally by the mere downward force of the weight of the wing, as it was at this position in the folding mode described above, because the dead weight of wing 60 tends to push the rod downward and resist its movement upward. The slotted hole mounting 93 in combination with the pivotal links 96, 102 are significant in this regard, since they provide sufficient flexibility to continue the momentum of the upward movement of the wing 60 required to carry the rod 112 over center upwardly while the direction of rod movement is reversed. Without this additional flexibility, the momentary cessation of rod 112 motion while changing from retraction to extension mode would also stop the upward pivotal movement of the wing. Without such upward pivotal momentum, the weight of the wing would prevent the lever 116 and rod 112 from being moved over center upwardly.

According to the method and apparatus of this invention, at the moment when retraction movement of the rod 112 stops, the pivotal momentum of the wing continues by pivoting in the links 96, 102 at the distal ends of the lift arms 94, 100. This pivoting in the links 96, 102 is possible because the slotted holes 93 allow the wing mounting brackets 90, 92 to move in relation to the shaft 86, even though the lift arms 94, 100 are held momentarily stationary as the rod 112 changes direction.

During this secondary pivot in the links 96, 102, the operator has time to reverse the hydraulic pressure to begin extending rod 112. Therefore, by the time the shaft 86 shifts to the opposite end of the slotted holes 93, hydraulic pressure is applied to extend rod 112 along with the continuing upward pivotal momentum of the wing 60. The combination of this upward momentum acting on the lift arms 94, 100 when the shaft 86 reaches the opposite end of slotted holes 93 along with the hydraulic pressure acting to extend rod 112 is sufficient to move lever 116 and rod 112 over center. The extension of rod 112 from hydraulic pressure in the cylinder 110 can then continue in the direction of arrow 196 to unfold the wing 60.

Figures 14, 15:
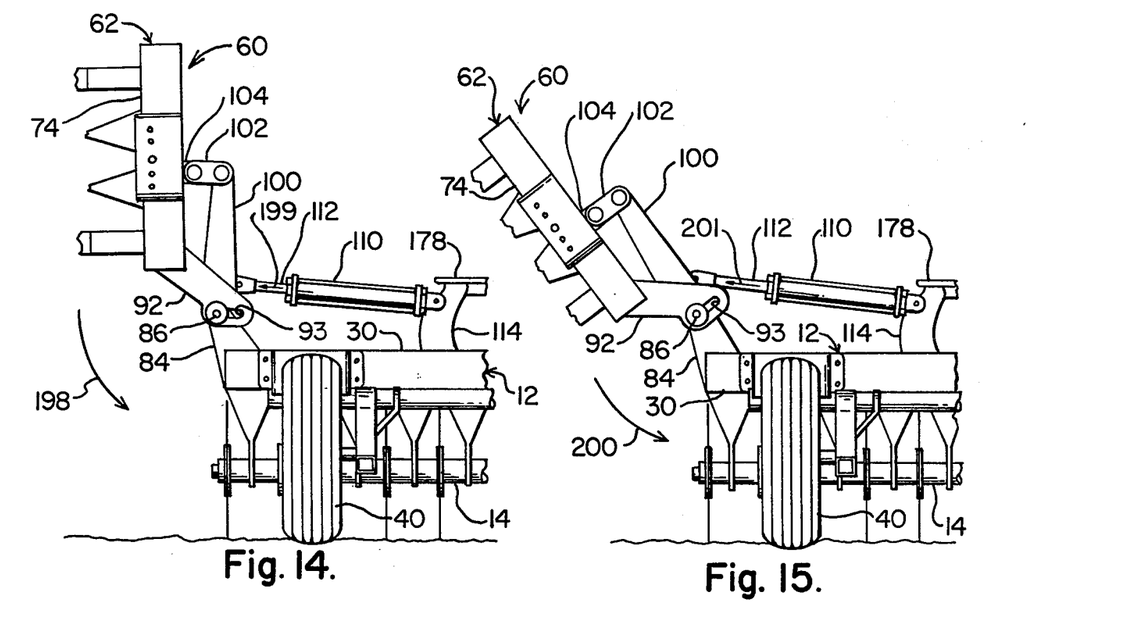
Figure 16:
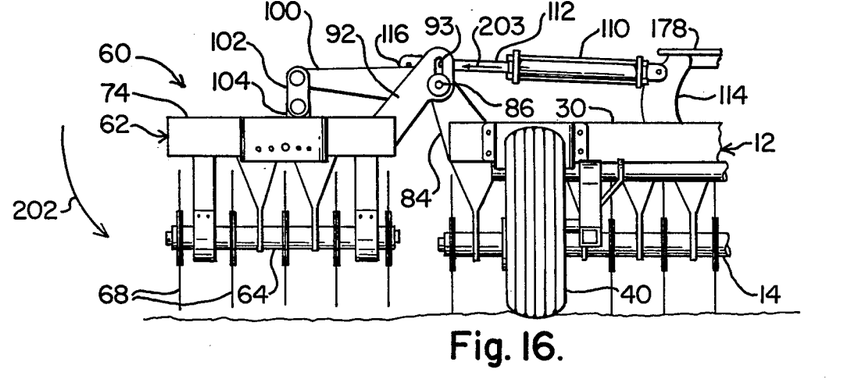

As the rod 112 of cylinder 110 continues to extend outwardly in the direction of arrow 199, the wing continues to unfold as shown by arrow 198 in FIG. 14. FIG. 15 illustrates a continuation of the sequential unfolding movement of wing 60 as the rod 112 continues to extend in the rod 112 continues to extend in the direction of arrow 201 and the wing continues to unfold in the direction of arrow 200. Throughout this portion of the pivotal unfolding movement, the shaft 86 remains in the same end of slotted hole 93, the position to which it was shifted in the over center movement illustrated in FIG. 13. This same position is maintained to the fully extended position of wing 60 shown in FIG. 16 as the rod 12 continues to extend in the direction of arrow 203 and the wing 60 continues to pivot in the direction of 202. Finally, as the wing 60 reaches full extension, it is free to flat vertically upwardly and downwardly or to pivot upwardly and downwardly as described above. For example, in the fully extended position shown in FIG. 17, with the ground having a sharp drop under the wing 60, the wing 60 can move vertically downward in relation to the main frame 12 as indicated by arrow 205, while the shaft 86 is shifted to the upper portion of slotted hole 93.

While the preceding description of the wing mounting and wing lift apparatus was directed to the description of the left wing 60 and the left wing lift apparatus 80, it should be noted that that structure and operation of the right wing 120 and the right wing lift apparatus 140 is the same.

The right wing 120 includes a rectangular wing frame 122 comprised of forward and rear parallel beams 132, 134, respectively, joined on the ends by parallel spaced apart inner beam 136 and outer beam 138. A plurality of flat, circular wing discs 128 are mounted on wing axle 124 in spaced apart relation to each other, and the wing axle 124 is rotatably mounted under the wing frame 122 by a plurality of spaced apart wing support and bearing blocks 126.

The wing 120 is mounted to the main frame 12 in a manner similar to the left wing 60. A pair of mounting brackets 142, 144 extend upwardly and outwardly from the end beam 34 of main frame 12, and a pair of wing mounting brackets 150, 152 extend upwardly and inwardly from the inner beam 136 of wing frame 122. The wing mounting brackets 150, 152 are pivotally mounted to the brackets 142, 144 by a shaft 146 extending therethrough. The wing mounting brackets 150, 152 are provided with slotted holes 153 at their distal ends through which the shaft 146 is positioned.

The left hydraulic lift apparatus 140 is comprised of an elongated pipe 148 mounted concentrically on shaft 146, and a pair of lift arms 154, 160 rigidly attached to and extending outwardly from the ends of pipe 148. The wing frame 122 is suspended from the distal ends of the lift arms 154, 160 by lengths 156, 162. The right hydraulic cylinder 170 is anchored at its blind end to a cylinder mounting bracket 174 on main frame 12, and the rod 172 is mounted to a rigid arm 176 extending rigidly upwardly and outwardly from the pipe 148. Therefore, it can be appreciated that the right wing 120 has the same flexibility of movement and ability to be pivoted through an angle greater than 180 degrees to the transportation and storage position shown in FIG. 3, similar to the above description for the left wing 60.

While the present invention has been described with a certain degree of particularity, it should be appreciated the the invention is defined by the following claims construed in view of the prior art so that modifications or changes can be made to the embodiments of the present invention without departing from the inventive concepts comprised herein.

What I claim is:

1. In agricultural and horticultural implement apparatus that have a main section of tools adapted to work a width of ground and extension wing apparatus of additional tools for increasing the effective width of ground that can be worked by the implement, the improvement comprising:

a wing bracket member extending from said extension wing apparatus toward said main section, said wing bracket member having an elongated slotted hole in the distal end thereof, which is substantially vertical when said extension wing apparatus is extended outwardly in the same horizontal plane as said main section;

a shaft attached to said main section, said shaft being oriented with its longitudinal axis congruent with said horizontal axis about which said extension wing is pivoted and extending through said slotted hole in said wing bracket member;

powered lift means for pivoting said extension wing apparatus about said horizontal axis from a work position laterally outward of said main section to a transportation and storage position over said main section and for pivoting said extension wing apparatus in the opposite direction from said transportation and storage position to said work position wherein said extension wing apparatus is pivoted by said powered lift means through an angle greater than 180 degrees.

2. In agricultural and horticultural implement apparatus that have a main section of tools adapted to work a width of ground and extension wing apparatus of additional tools for increasing the effective width of ground that can be worked by the implement, the improvement comprising:

a wing bracket member extending from said extension wing apparatus toward said main section, said wing bracket member having an elongated slotted hole in the distal end thereof, which is substantially vertical when said extension wing apparatus is extended outwardly in the same horizontal plane as said main section;

a shaft attached to said main section, said shaft being oriented with its longitudinal axis congruent with said horizontal axis about which said extension wing is pivoted and extending through said slotted hole in said wing bracket member;

an elongated lift arm, one end of which is pivotally mounted on said shaft and the distal end of which extends outwardly over said extension wing apparatus, said distal end of said lift arm being connected to said extension wing apparatus a spaced distance outwardly from said shaft, and reversible hydraulic motion producing means connected to said lift arm for pivoting said lift arm about said shaft.

3. The improvement in agricultural and horticultural implement apparatus of claim 2, wherein said reversible hydraulic motion producing means is a hydraulic cylinder, the blind end of which is pivotally anchored to said main section a spaced distance inwardly of said shaft and the rod end of which is pivotally attached to said lift arm in such a manner that it is extended over and outward from said shaft when the extension wing apparatus is in said work position and retracts inward from said shaft as the extension wing is pivoted upward from said work position toward said transportation and storage position, the point of attachment of said rod to said lift arm also being rotatable inwardly and downwardly below a straight line extending through said shaft and said blind end anchor such that extension of said rod below said straight line causes the extension wing to continue pivoting in the same direction toward said transportation and storage position.

4. The improvement in agricultural and horticultural implement apparatus of claim 3, including an elongated pipe rotatably mounted on said shaft and rigidly attached to said one end of said lift arm, and an elongated lever rigidly attached to and extending outward from said pipe, said cylinder rod being pivotally connected to the distal end of said lever.

5. The improvement in agricultural and horticultural implement apparatus of claim 3, wherein said distal end of said lift arm is pivotally connected to said extension wing apparatus.

6. The improvement in agricultural and horticultural implement apparatus of claim 5, including an elongated link pivotally connected at one end to the distal end of said lift arm and pivotally connected at the opposite end to said extension wing apparatus.

7. The improvement in agricultural and horticultural implement apparatus of claim 6, wherein the distal end of said lift arm is connected to said wing extension apparatus near the mid-section of said wing extension apparatus where the weight of said wing extension apparatus outward of said connection approximately balances the weight inward of the connection.

8. The method of folding and unfolding an extension wing section on agricultural and horticultural implements through an angle greater than 180 degrees, comprising the steps of:

positioning a horizontal shaft between said wing section and the main section of the implement perpendicular to a vertical plane passing through the main section and the wing section and attaching the shaft to the main section;

pivotally connecting the wing section to the main section by positioning a member of said wing section with a slotted hole therethrough adjacent said main section in such a manner that said shaft passes through said slotted hole, the wing being pivotal about said shaft hole and movable linearly in one dimension in relation to said shaft;

connecting a lift arm pivotally at one end to the wing section and at the other end to said shaft;

connecting a hydraulic cylinder to the lift arm in such a manner that retraction and extension of the cylinder rod is effective to rotate the lift arm about said shaft, retracting said cylinder rod to lift upwardly on the wing section and to pivot the wing section about the shaft toward the main section until the cylinder mounting pins align in a straight line with the shaft, allowing the weight of the wing to move the rod over center out of such alignment, and extending said rod to continue said rotation of the wing section about said shaft;

reversing the direction of rotation of the wing section about said shaft by retracting the cylinder rod to provide a lifting force under the wing to move it upward until the cylinder mounting pins align in a straight line with the shaft, allowing the momentum of the pivoting wing section about said shaft shift pivot the wing about the pivotal connection of the lift arm to the wing section as the shaft is shifted from one end of the slotted hole to the other and as the motion of the rod is reversed to begin extension, and extending the rod as the momentum of the pivoting wing section shifts back to pivot about said shaft and moves the rod over center when the pivotal movement of the wing section about the connection of the lift arm to the wing section is terminated and shifted back to pivot about said shaft when the shaft reaches said other end of said slotted hole; and continuing to extend said rod to continue rotating the wing section about the shaft in the reverse direction.

* * * * *